(12) United States Patent
Yamada et al.

(10) Patent No.: US 7,680,946 B2
(45) Date of Patent: Mar. 16, 2010

(54) STREAM DATA PROCESSING DEVICE, STREAM DATA PROCESSING METHOD, PROGRAM, AND MEDIUM

(75) Inventors: Mikihiko Yamada, Osaka (JP); Shouichi Gotoh, Osaka (JP); Satoshi Okamoto, Osaka (JP)

(73) Assignee: Panasonic Corporation, Osaka (JP)

( * ) Notice: Subject to any disclaimer, the term of this patent is extended or adjusted under 35 U.S.C. 154(b) by 1344 days.

(21) Appl. No.: 10/476,282

(22) PCT Filed: Apr. 1, 2003

(86) PCT No.: PCT/JP03/04151

§ 371 (c)(1), (2), (4) Date: May 12, 2004

(87) PCT Pub. No.: WO03/084164

PCT Pub. Date: Oct. 9, 2003

(65) Prior Publication Data

US 2004/0215803 A1 Oct. 28, 2004

(30) Foreign Application Priority Data

Apr. 2, 2002 (JP) .............................. 2002-100378

(51) Int. Cl.
G06F 15/16 (2006.01)
G06F 3/00 (2006.01)
H04L 12/56 (2006.01)

(52) U.S. Cl. ....................... 709/231; 709/201; 709/246; 710/52; 370/392

(58) Field of Classification Search ......... 709/201–202, 709/230–232, 246; 710/1, 36–37, 52; 370/392
See application file for complete search history.

(56) References Cited

U.S. PATENT DOCUMENTS

| 5,966,385 | A | | 10/1999 | Fujii et al. | |
|---|---|---|---|---|---|
| 6,021,197 | A | * | 2/2000 | von Willich et al. | 380/212 |
| 6,389,468 | B1 | * | 5/2002 | Muller et al. | 709/226 |
| 6,477,185 | B1 | * | 11/2002 | Komi et al. | 370/536 |
| 6,807,191 | B2 | * | 10/2004 | Fujii et al. | 370/464 |
| 6,944,186 | B2 | * | 9/2005 | Zaun et al. | 370/487 |
| 6,948,186 | B1 | * | 9/2005 | Brosey | 725/151 |
| 6,977,901 | B2 | * | 12/2005 | Ito et al. | 370/242 |
| 7,024,685 | B1 | * | 4/2006 | Foster et al. | 725/151 |

(Continued)

FOREIGN PATENT DOCUMENTS

EP 0 917 356 5/1999

(Continued)

OTHER PUBLICATIONS

International Search Report corresponding to application No. PCT/JP03/04151 dated Jun. 10, 2003.

*Primary Examiner*—Nathan Flynn
*Assistant Examiner*—Joshua Joo
(74) *Attorney, Agent, or Firm*—RatnerPrestia

(57) ABSTRACT

A stream data processor suitable for various applications and which performs the process of various types of stream inputs in packet data. In the stream data processor which decides individually and sequentially whether packets forming an input stream are to be processed by a predetermined process, after stream data is temporarily stored packet by packet, packet selection and data processing based on a packet identifier present in any bit position are possible.

14 Claims, 12 Drawing Sheets

U.S. PATENT DOCUMENTS

| | | | |
|---|---|---|---|
| 7,565,460 B2 * | 7/2009 | Morinaga | 710/22 |
| 2002/0024610 A1 * | 2/2002 | Zaun et al. | 348/366 |
| 2002/0107903 A1 * | 8/2002 | Richter et al. | 709/201 |
| 2002/0156943 A1 * | 10/2002 | Ishimura et al. | 710/5 |
| 2003/0014572 A1 * | 1/2003 | Avery | 710/52 |
| 2005/0044175 A1 * | 2/2005 | Cheung | 709/217 |
| 2006/0080110 A1 * | 4/2006 | Foster et al. | 704/500 |

FOREIGN PATENT DOCUMENTS

| | | |
|---|---|---|
| JP | 10-290205 | 10/1998 |
| JP | 11-262002 | 9/1999 |
| JP | 2000-78193 | 3/2000 |
| JP | 2000-83064 | 3/2000 |
| JP | 2000-201125 | 7/2000 |
| JP | 2001-523927 | 11/2001 |
| JP | 2001-339721 | 12/2001 |
| JP | 2002-94996 | 3/2002 |
| WO | WO 99/26409 | * 11/1998 |

* cited by examiner

STREAM DATA PROCESSING DEVICE, STREAM DATA PROCESSING METHOD, PROGRAM, AND MEDIUM

TECHNICAL FIELD

The present invention relates to a stream data processor which identifies whether each of packets forming an input data stream is to be processed by a predetermined process, and if the packet is to be processed by the predetermined process, after performing the predetermined process, outputs in a predetermined format, and the like, and particularly to a stream data processor which can process a plurality of data streams having a different format, and the like.

BACKGROUND ART

Conventional stream data processors perform a predetermined process on a single data stream in a specific format and then output. For example, a transport stream in ISO/IEC 13818-1 (MPEG2 system) is widely known as a format of data streams. For the transport stream, a plurality of program data and other secondary information are formed into packets, and the packets are respectively given packet IDs for identifying them and form one stream. In a transport stream packet, the position and length of a bit in which a packet ID is present are fixed. Also, a packet ID is uniquely determined in a single transport stream, while duplication of packet IDs can occur in packets included in a plurality of transport streams.

A conventional stream data processor is shown in FIG. 10.

The conventional stream data processor comprises a stream input portion 1001, a packet filter 1002, a packet data processing portion 1003, and a stream output portion 1004.

The stream input portion 1001 detects a packet header from continuous bit strings in an input stream and outputs packet data.

The packet filter 1002 determines as a packet ID a bit string at a specific position in the input packet data and compares it with a designated bit string. When they match, this packet is output.

The packet data processing portion 1003 performs a predetermined process on the packet data.

The stream output portion 1004 outputs the processed packet data in a predetermined format.

The conventional stream data processor addresses only a specific format for the identification of a packet and performs a specific process for the format. In addition, it does not address simultaneous processes of a plurality of streams.

Next, a stream data processor, in which the function of the conventional stream data processor is extended so that two types of streams can be processed, is shown in FIG. 11.

In FIG. 11, the format of an input stream is analyzed in a packet analysis portion 1005, and according to the format, which process result of two packet filters 1002, which are provided so that two different types of formats can be addressed, is selected in a packet selector 1006. Similarly, which process result of two packet data processing portions 1003, which are provided so that two different types of formats can be addressed, is selected in a packet selector 1006.

FIG. 12 is a stream data processor, which is extended by locating two of the stream data processors in FIG. 11 in parallel so that two data streams each having a different type of format can be processed simultaneously.

However, when a plurality of data stream processors are formed by locating a plurality of conventional packet filters and conventional stream data processors in parallel as in FIGS. 11 and 12, the size of the device increases in proportion to the number of data streams processed, leading to an increased cost.

In this way, using conventional technique, when a data stream having a further different format is processed, or when the number of data streams processed simultaneously is increased, the size of the device further increases.

Because the identification of packets in streams having a plurality of different formats is performed, a packet filter for each format is needed. In addition, if a plurality of conventional stream data processors are provided in parallel to process a plurality of data streams simultaneously, the size of the device increases in proportion to the number of data streams processed simultaneously.

In addition, when a packet filter is provided for each format of streams, the operation of packet filters except for one corresponding to an input stream is unnecessary. For data processing portions, similarly, data processing portions except for one performing a necessary process for the packet data need not be operated. In this way, many portions that need not be operated simultaneously are present in the device, leading to much waste in the structure of the device.

DISCLOSURE OF THE INVENTION

In view of such problems of conventional stream data processors, it is an object of the present invention to provide a stream data processor which can achieve a smaller device and a lower cost, and the like.

A first invention of the present invention is a stream data processor of processing and editing one or a plurality of data streams, comprising one or a plurality of stream input portions of receiving an input data stream and performing detection of a packet header and data transfer to a buffer of storing packets; an arbitration portion of performing arbitration of a request of data transfer to the buffer of storing packets; a buffer cell allocation directing device of directing allocation of a buffer cell, one of buffers, for input of the packet header; a buffer cell allocator of allocating an unused buffer cell based on buffer cell allocation information, according to the direction of allocation of the buffer cell; a buffer cell allocation information storing portion of storing the buffer cell allocation information; a packet buffer of storing the packet data; a packet buffer controller of controlling the packet buffer; a process-waiting buffer cell information storing portion of storing a buffer cell to be processed and its process order; a packet filter of determining whether to be processed or not based on a packet identifier; one or a plurality of packet data processing portions of performing a predetermined process for the packet data; and one or a plurality of stream output portions of reconstructing the packet data as a stream and then outputting the stream.

A second invention of the present invention is the stream data processor according to the first invention of the present invention, wherein the packet buffer comprises one storage, and the stream input portions and the processing portions respectively perform arbitration and data transfer for the packet buffer to perform packet data processing.

A third invention of the present invention is the stream data processor according to the first invention of the present invention, wherein the packet filter is connected to the arbitration portion, and the packet filter obtains the packet identifier of a packet stored in the packet buffer by performing data transfer request to the arbitration portion and determines whether to be processed or not.

A fourth invention of the present invention is the stream data processor according to the first invention of the present invention, wherein the packet filter is connected to a controller, the controller supplies a packet identifier that is read from a packet stored in the packet buffer to the packet filter, and based on this, the packet filter determines whether to be processed or not.

A fifth invention of the present invention is the stream data processor according to the first invention of the present invention, wherein a plurality of packet filters of determining, from the packet identifier of packet data included in a specific type of stream, whether to be processed or not are provided to enable identification with the packet identifiers of packets included in different types of stream data.

A sixth invention of the present invention is the stream data processor according to the first invention of the present invention, wherein the stream data processor has a packet filter which comprises a packet identifier reference table, a packet identifier mask table of making all or specific part of a packet identifier out of identification, an AND operator, and a comparator, and which determines whether a packet is to be processed or not by comparing a logical product of a packet identifier in the packet data and the packet identifier mask table and a logical product of the packet identifier reference table and the packet identifier mask table, and wherein identification of a packet included in stream data in which a bit length of a packet identifier is different is made possible.

A seventh invention of the present invention is the stream data processor according to the sixth invention of the present invention, wherein the stream data processor further has a process content table corresponding one-to-one to the packet identifier reference table, a packet having a specific packet identifier is detected by the packet filter, and process of the packet is performed by referring to the process content table.

An eighth invention of the present invention is the stream data processor according to the first invention of the present invention, wherein the stream data processor has a packet filter which comprises a packet identifier reference table, a stream identifier reference table, an AND operator, and a comparator, and which determines whether a packet is to be processed or not by comparing a packet identifier in the packet data and the packet identifier reference table as well as comparing a stream identifier in the packet data and the stream identifier reference table, and wherein packet selection is possible even when there is duplication of packet identifiers among a plurality of streams.

A ninth invention of the present invention is the stream data processor according to the eighth invention of the present invention, wherein the stream data processor further has a process content table corresponding one-to-one to the stream identifier reference table, and process of a packet having a specific packet identifier included in a specific data stream is performed by referring to the process content table.

A tenth invention of the present invention is the stream data processor according to the first invention of the present invention, wherein the stream data processor has a packet filter which comprises a packet identifier reference table, a packet identifier mask table of making all or specific part of a packet identifier out of identification, a stream identifier reference table, an AND operator, and a comparator, and which determines whether a packet is to be processed or not by comparing a logical product of a packet identifier in the packet data and the packet identifier mask table and a logical product of the packet identifier reference table and the packet identifier mask table as well as comparing a stream identifier in the packet data and the stream identifier mask table, and wherein identification of a packet included in a plurality of stream data in which a packet identifier has a different bit length is possible.

An eleventh invention of the present invention is the stream data processor according to the tenth invention of the present invention, wherein the stream data processor further has a process content table corresponding one-to-one to the packet identifier reference table, and process of a packet having a specific packet identifier included in a specific data stream is performed by referring to the process content table.

A twelfth invention of the present invention is the stream data processor according to the first invention of the present invention, wherein the process-waiting buffer cell information storing portion of storing a number of a buffer cell to be processed comprises one storage element of storing the number of a buffer processed in the packet data processing portion in its process order.

A thirteenth invention of the present invention is the stream data processor according to the first invention of the present invention, wherein the process-waiting buffer cell information storing portion of storing a number of a buffer cell to be processed comprises one storage element of storing the number of a buffer processed in the packet data processing portion in its process order and further stores the content of a predetermined process performed in the packet data processing portion.

A fourteenth invention of the present invention is the stream data processor according to the first invention of the present invention, wherein the process-waiting buffer cell information storing portion of storing a number of a buffer cell to be processed comprises one storage element of storing the number of a buffer processed in the packet data processing portion in its process order and further stores the number of a table for referring to the process content.

A fifteenth invention of the present invention is the stream data processor according to the first invention of the present invention, wherein in the buffer cell allocation information storing portion of storing buffer cell allocation information, when there is no buffer to be allocated, that is, all buffers are used, this is detected in the buffer cell allocator, and no buffer is allocated for a buffer cell allocation request.

A sixteenth invention of the present invention is a stream data processing method of processing and editing one or a plurality of data streams, comprising the steps of:

receiving an input data stream by one or a plurality of input portions and performing detection of a packet header and data transfer to a buffer of storing packets;

performing arbitration of a request of data transfer to the buffer of storing packets by an arbitration portion;

directing allocation of a buffer cell, one of buffers, for input of the packet header by a directing device;

allocating an unused buffer cell based on buffer cell allocation information, according to the direction of allocation of the buffer cell by a buffer cell allocator;

storing the buffer cell allocation information by a buffer cell allocation information storing portion;

storing the packet data by a packet buffer;

controlling the packet buffer by a packet buffer controller;

storing a buffer cell to be processed and its process order by a process-waiting buffer cell information storing portion;

determining whether to be processed or not based on a packet identifier by a packet filter;

performing a predetermined process for the packet data by one or a plurality of packet data processing portions; and reconstructing the packet data as a stream for output by one or a plurality of stream output portions, A seventeenth invention of the present invention is a program of making a computer function as all or part of one or a plurality of stream input portions of receiving an input data stream and performing detection of a packet header and data transfer to a buffer of storing a packet; an arbitration portion of performing arbitration of a request of data transfer to the buffer of storing the packet; a buffer cell allocation directing device of directing allocation of a buffer cell, one of buffers, for input of the head of the packet; a buffer cell allocator of allocating an unused buffer cell based on buffer cell allocation information, according to the direction of allocation of the buffer cell; a buffer cell allocation information storing portion of storing the buffer cell allocation information; a packet buffer of storing the packet data; a packet buffer controller of controlling the packet buffer; a process-waiting buffer cell information storing portion of storing a buffer cell to be processed and its process order; a packet filter of determining whether to be processed or not based on a packet identifier; one or a plurality of packet data processing portions of performing a predetermined process for the packet data; and one or a plurality of stream output portions of reconstructing the packet data as a stream for output in the stream data processor according to claim 1.

An eighteenth invention of the present invention is a medium supporting the program according to the seventeenth invention of the present invention, which can be processed by a computer.

Figure 1:
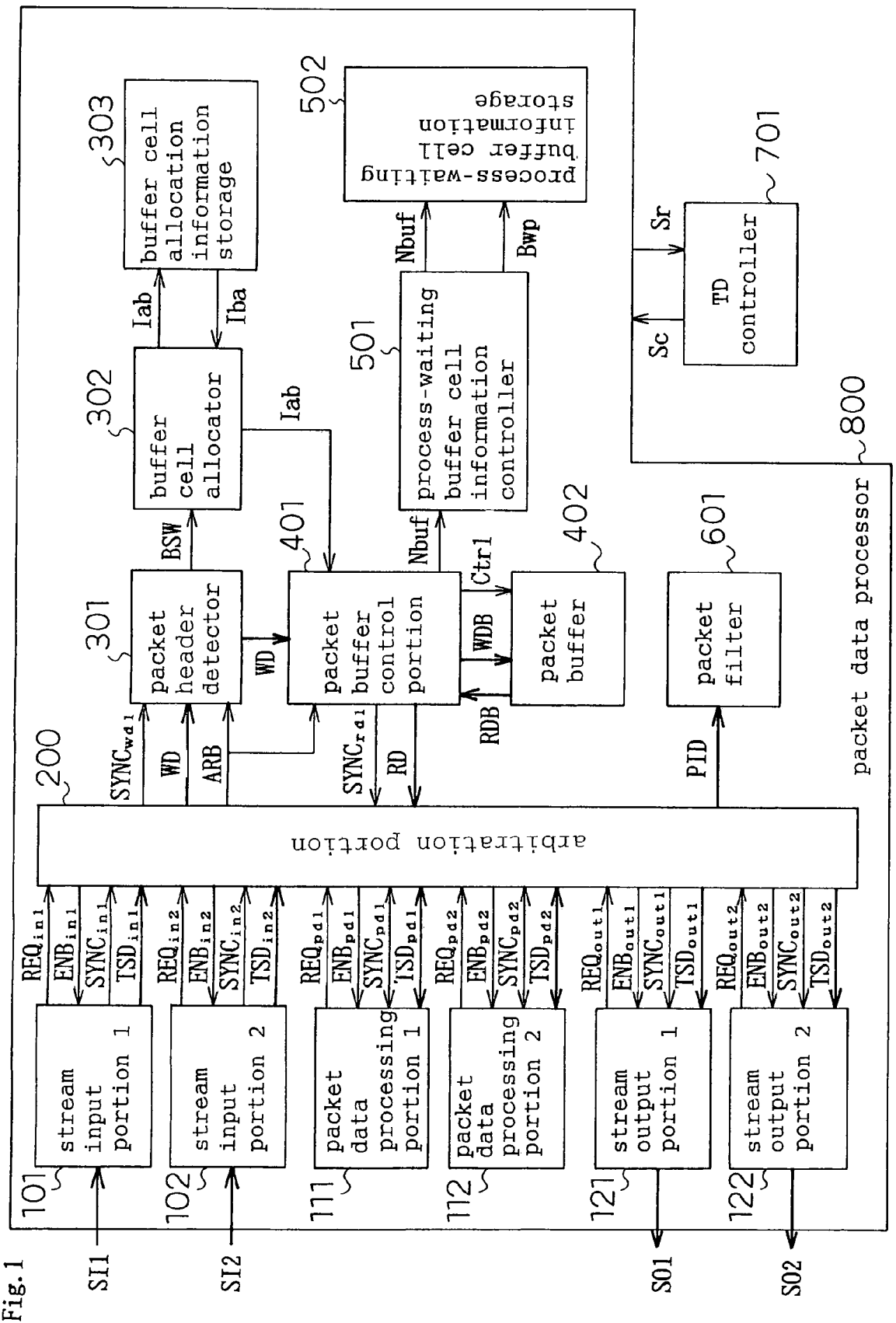
FIG. 1 is a system diagram of a stream data processor capable of processing various types of streams according to a first embodiment of the present invention.

EXPLANATION OF REFERENCES 101 stream input portion 1
102 stream input portion 2
111 packet data processing portion 1
112 packet data processing portion 2
121 stream output portion 1
122 stream output portion 2
200 arbitration portion
301 packet header detector
302 buffer cell allocator
303 buffer cell allocation information storage
401 packet buffer control portion
402 packet buffer
501 process-waiting buffer cell information controller
502 process-waiting buffer cell information storage
601 packet filter
701 TD controller
800 packet data processor
SI1, SI2 a stream input from a stream source (not shown)
REQ data transfer request signal
ENB data effective signal
SYNC packet start signal
TSD transfer data
ARB source of accepting a data transfer request
BSW buffer cell allocation direction
Iab buffer cell allocation information
Iba buffer cell use information
WD packet buffer write data
RD packet buffer read data
Ctrl packet buffer control signal
Nbuf process-waiting buffer cell number
Bwp a storage destination direction signal to a process-waiting buffer cell information storage
PID the packet identifier of a packet stored in a buffer cell to be processed
Sc a control signal of controlling the operation of each component of a packet data processor 800
Sr a state signal of notifying the state of each component of a packet data processor 800
Ac1, Ac2, Ac3, ... AcN buffer cell allocation information area
bc1, bc2, bc3, ... bcN buffer cell
Rc1, Rc2, Rc3, ... RcN buffer cell designation area
RP process-waiting buffer cell information storage read pointer
WP process-waiting buffer cell information storage write pointer
TSIDREG stream identifier register
PIDREG packet identifier register
MREG mask information register
PREG packet identifier reference register
STAB stream identifier reference table
TST[1], TST[2], ... TST[a] stream identifier reference table element
PTAB packet identifier reference table
LUT[1], LUT[2], ... LUT[a] packet identifier reference table element
MTAB mask information reference table
MSK[1], MSK[2], ... MSK[a] mask information reference table element
DTAB process content table
DT[1], DT[2], ... DT[a] process content table element
BAND AND operator for each bit
CMP comparator
1001 stream input portion
1002 packet filter
1003 packet data processing portion
1004 stream output portion 1005 packet analysis portion
1006 packet selection portion

BEST MODE OF CARRYING OUT THE INVENTION

First Embodiment

A first embodiment of the present invention is described using FIG. 1.

Since a stream input portion 101 and a stream input portion 102 in FIG. 1 of the present invention are functionally the same, only the stream input portion 101 is described below.

The stream input potion 101 receives stream input SI1 from a stream source, which is not shown, detects the head of a packet, and transfers the data, packet by packet, to an arbitration portion 200.

Figure 2:
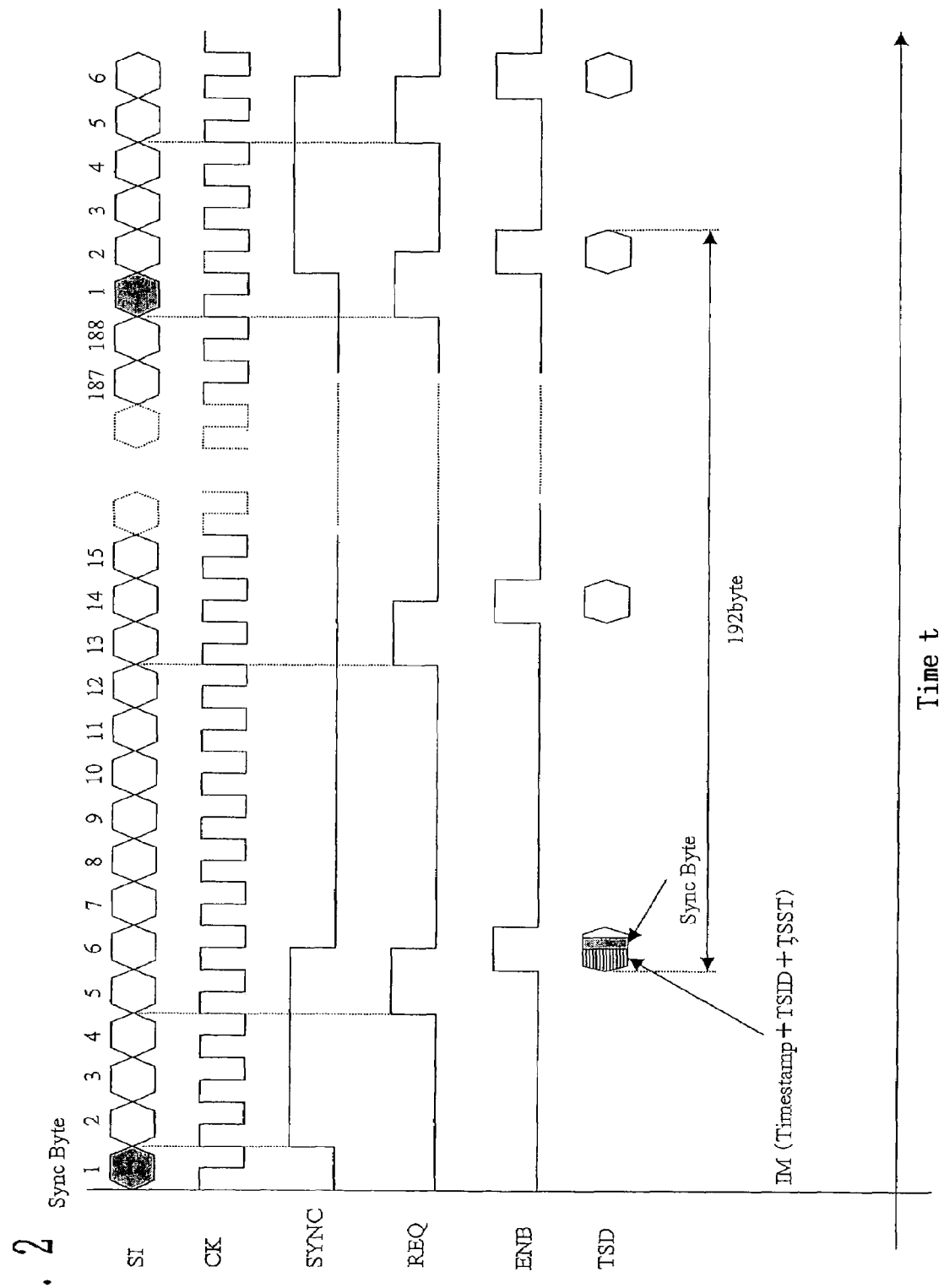
FIG. 2 is a timing chart of signals relating to a stream input portion as shown in FIG. 1.

This data transfer is described using FIG. 2.

The stream input portion 101 checks data input from a stream source, and when it detects the head of a packet, it notifies the transfer of the packet header to the arbitration portion 200 by signal SYNC.

Signal SYNC, which indicates the transfer of a packet header, is generated when the packet header is included in data transferred, and it is not generated when no packet header is included in the data transferred. The stream input portion 101 provides additional information IM to the data input from the stream source to perform data transfer. Additional information IM includes at least stream identifier TSID and stream type indicating code TSST and enables identification, even after being stored in a packet buffer 402, as to what type of stream the packet belongs to, and from which stream source the stream is input. In addition to stream identifier TSID, a time stamp, which indicates the time when the packet header is input to the stream input portion 101, and the like can be provided for the timing control of data processing and data output.

Also, the stream input portion 101 temporarily stores the data input from the stream source in the internal buffer. When data having a predetermined number of bytes is stored, signal REQ, which requests data transfer for writing into the packet buffer 402, is output to the arbitration portion 200.

Figure 6:
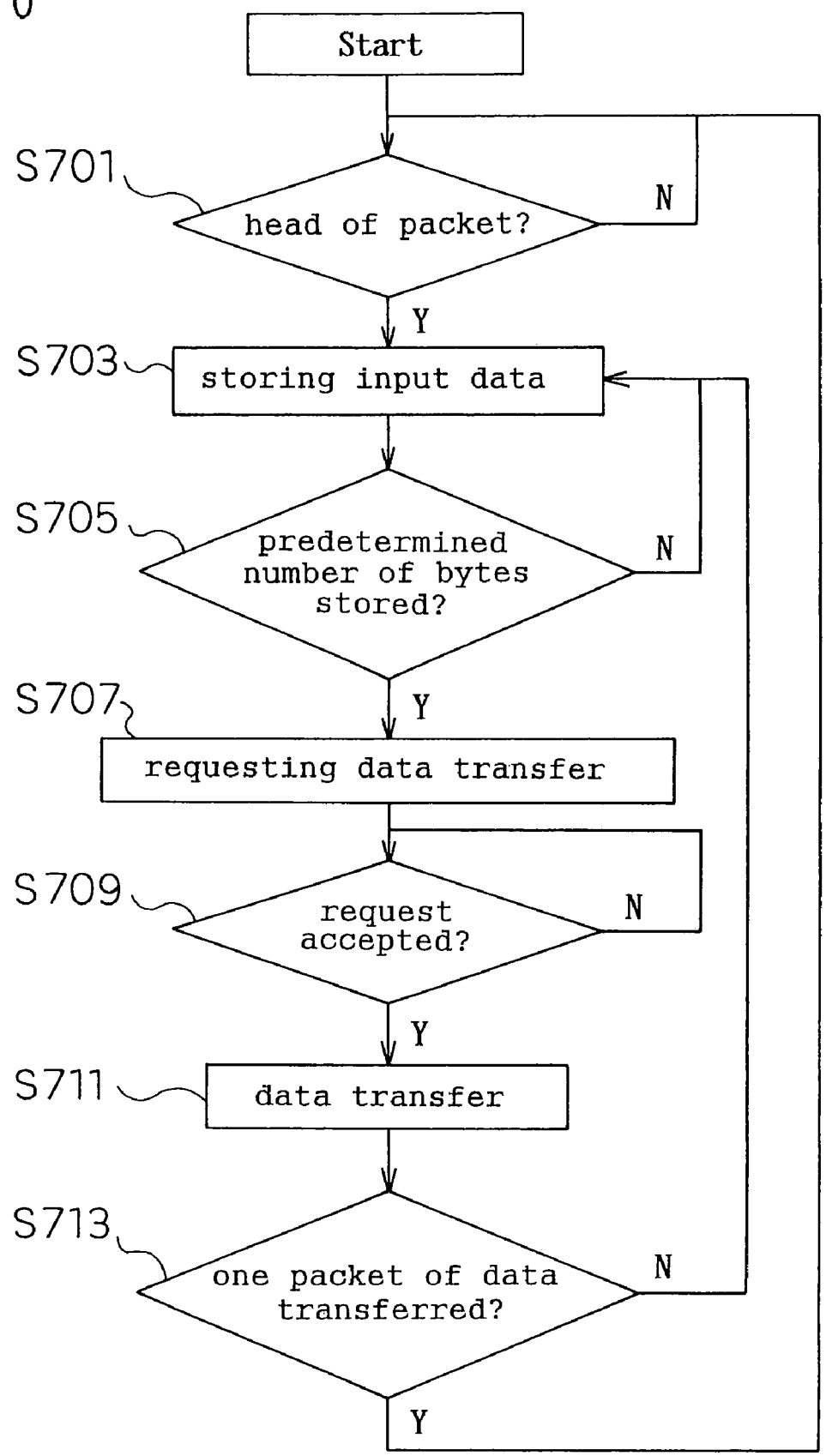
FIG. 6 is a flow chart showing the operation of storing a stream input, packet by packet, into a packet buffer 402 in FIG. 1.

The process algorithm of the stream input portion 101 is described using FIG. 6. The stream input portion 101 starts its operation according to the direction of a TD control portion 701, and the process proceeds to step S701.

In step S701, the stream input portion 101 searches for the head of a packet included in an input stream. It continues this until it detects the packet header. This is done for storing a complete packet in the packet buffer and for preventing the storing of data from the middle of the packet. When the packet header is detected, the process proceeds to the next step S703.

In step S703, the stream input portion 101 stores the data of the input stream in the internal buffer. Then, the process proceeds to the next step S705.

In step S705, whether the stream input portion 101 has stored data having a predetermined number of bytes in the internal buffer or not is determined. The case where the predetermined number of bytes is not reached is determined as No, and the process returns to step S703. The case where the predetermined number of bytes is reached is determined as Yes. Then, the process proceeds to the next step S707.

In step S707, the stream input portion 101 outputs data transfer request signal Req to the arbitration portion 200 in order to transfer the data stored in the internal buffer to the packet buffer 402. Then, the process proceeds to the next step 709.

In step S709, whether the data transfer request of the stream input portion 101 has been accepted or not is determined. That is, whether data effective signal ENB, which indicates that the data transfer request has been accepted from the arbitration portion 200, is effective or not is determined. The case where data effective signal ENB is not effective is determined as No, then, the process returns to step S709, and this is continued until data effective signal ENB becomes effective. The case where data effective signal ENB is effective is determined as Yes. Then, the process proceeds to the next step S711.

In step S711, the stream input portion 101 outputs to the arbitration portion 200 in order to transfer the data stored in the internal buffer to the packet buffer 402. Then, the process proceeds to the next step S713.

In step S713, whether one packet of data has been transferred from the stream input portion 101 to the packet buffer 402 or not is determined. The case where the transfer of one packet of data is not completed is determined as No, and the process returns to step S703. The case where the transfer of one packet of data is completed is determined as Yes, and the process returns to step S701 and prepares for the input of the next packet data.

The arbitration portion 200 receives a plurality of data transfer requests, such as a data transfer request for writing into the packet buffer 402 as described above and a data transfer request for reading from the packet buffer 402 as will be described later, performs arbitration, and decides which data transfer is performed. When the accepted data transfer request is that for writing into the packet buffer 402, the arbitration portion 200 generates data effective signal ENB to the data transfer requesting source of the accepted data transfer request to notify that the data transfer request has been accepted, receives transfer data TSD, and outputs the data and SYNC, which indicates that a packet header is included in the data, to a packet header detector 301. Also, the arbitration portion 200 outputs signal ARB, which indicates the data transfer requesting source selected by the arbitration, to the packet header detector 301 and a packet buffer controller 401.

When the accepted data transfer request is that for reading from the packet buffer 402, signal ARB, which indicates the data transfer requesting source of accepting a data transfer request, is output to the packet buffer controller 401. The packet buffer controller 401 reads the data from the packet buffer 402 and outputs it to the arbitration portion 200. When the output data includes a packet header, signal SYNC, which indicates the transfer of the packet header, is output to the arbitration portion 102.

When the packet header detector 301 detects that a packet header is included in transfer data WD, it outputs buffer cell allocation request signal BSW to direct a buffer cell allocator 302 to allocate a new packet storage area in the packet buffer 402.

Hereinafter, each area for storing one packet of data in the packet buffer 402 is referred to as a buffer cell.

When the buffer cell allocator 302 receives buffer cell allocation request signal BSW, it decides an unused buffer cell as an area for newly storing data by referring to buffer cell use information Iba as will be described later and outputs a number of the allocated buffer cell as buffer cell allocation information Iab to a buffer cell allocation information storage 303 and the packet buffer controller 401.

The buffer cell allocation information storage 303 receives buffer cell allocation information Iab output from the buffer cell allocator 302 to store information on how the buffer cell has been allocated, and the buffer cell allocation information storage 303 notifies buffer cell use state Iba to the buffer cell allocator 302.

The packet buffer control portion 401 controls the reading and writing of data from and into the packet buffer 402. More specifically, the packet buffer control portion 401 calculates to which buffer cell in the packet buffer 402 transfer is performed, from signal ARB, which indicates the data transfer requesting source of accepting a data transfer request output by the arbitration portion 200, and the buffer cell allocator 302. Also, signal SYNC, which indicates the transfer of a packet header, shows the first transfer to the buffer cell. In subsequent transfer to the buffer cell, a transfer destination in the buffer cell is calculated by storing a transfer destination for each transfer requesting source.

For data writing, the packet buffer control portion 401 receives write data WD from the packet header detector 301 and directs the packet buffer 402 to write using control signal Ctrl, and the write data is written into the transfer destination.

When writing into the buffer cell is completed, that is, when the next data to be processed is stored in the buffer cell, signal Nbuf, which indicates the buffer number, is output to a process-waiting buffer cell information controller 501.

For data reading, the packet buffer control portion 401 directs the packet buffer 402 to read using control signal Ctrl, reads read data RD from the transfer destination, and outputs it to the arbitration portion 200. Also, when a packet header is included in data RD read, the packet buffer control portion 401 outputs signal SYNCrd1, which indicates the transfer of the packet header, to the arbitration portion 200.

The packet buffer 402 performs data writing and reading according to the direction of the packet buffer control portion 401. It is desired that the packet buffer 402 comprises a memory, the detailed explanation of which is omitted as it is publicly known art.

The process-waiting buffer cell information controller 501 receives signal Nbuf, which indicates a number of a buffer in which the next data to be processed is present, from the packet buffer controller 401 and outputs this together with signal Bwp, which indicates a storage destination in a process-waiting buffer cell information storage 502, to the process-waiting buffer cell information storage 502.

The process-waiting buffer cell information storage 502 stores signal Nbuf, which indicates a number of a buffer in which the next data to be processed is present, in the storage destination indicated by signal Bwp, according to the direction of the process-waiting buffer cell information controller 501. It is desired that the process-waiting buffer cell information storage 502 comprises a FIFO (Fast In Fast Out) type memory, the detailed explanation of which is omitted as it is publicly known art.

Figure 3:
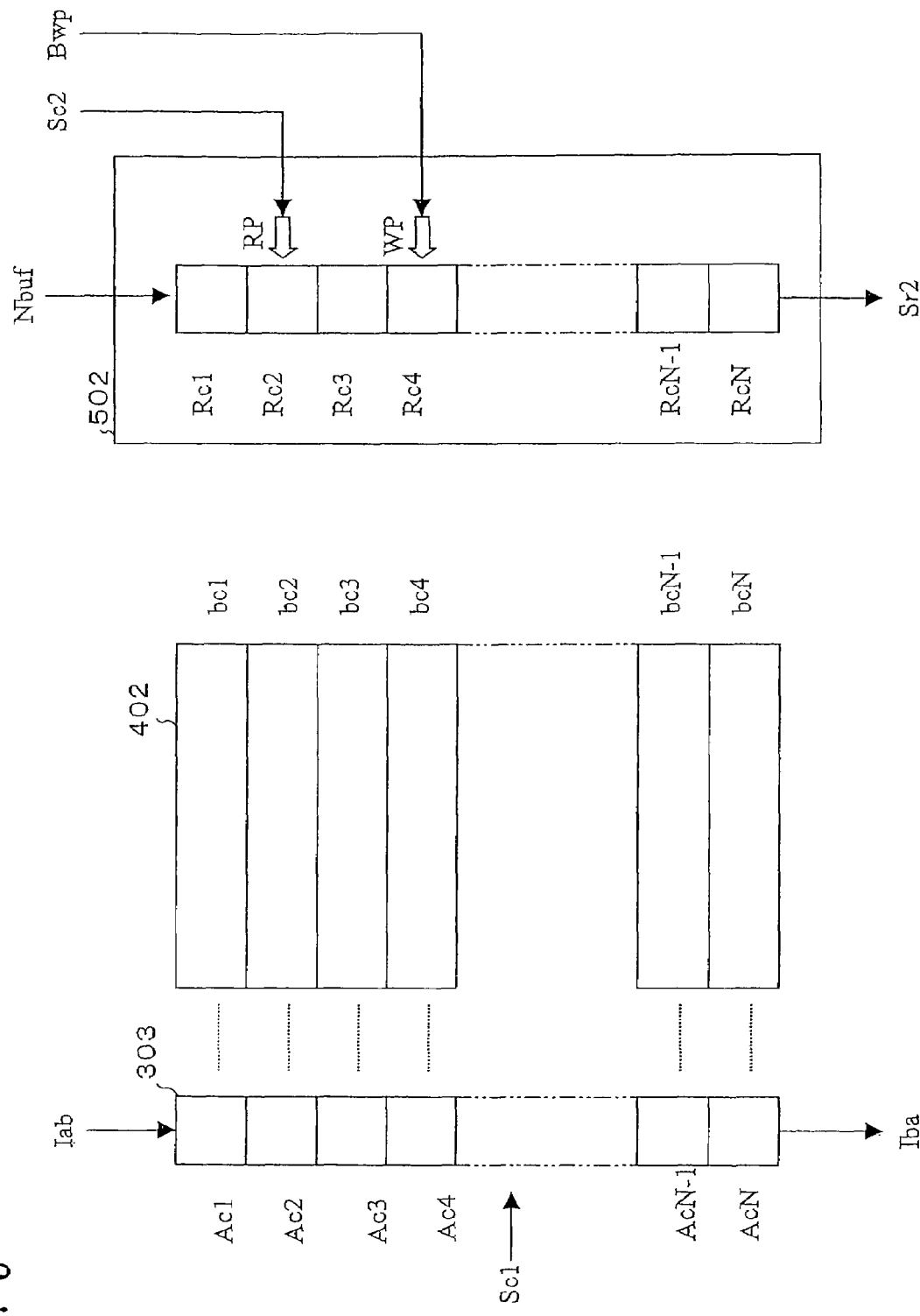
FIG. 3 is an explanation chart showing the relationship among a buffer cell allocation information storage 303, a packet buffer 402, and a process-waiting buffer cell information storage 502 as shown in FIG. 1.

Next, referring to FIG. 3, the relationship among the buffer cell allocation information storage 303, the packet buffer 402, and the process-waiting buffer cell information storage 502 as described above is briefly described. The packet buffer 402 includes N buffer cells bc1-bcN (N is a natural number of 2 or more) for temporarily storing packet data input from the stream input portions 101 and 102 and packet data processing portions 111 and 112.

The buffer cell allocation information storage 303 has buffer cell allocation information areas Ac1-AcN respectively corresponding to the buffer cells bc1-bcN of the packet buffer 402. The buffer cell allocation information storage 303 writes allocation identification data, which indicates allocation or no allocation, into the buffer cell allocation information area Acn corresponding to the allocated buffer cell bcn (n is a natural number of 1 or more and N or less), based on buffer cell allocation information Iab supplied from the buffer cell allocator 302. That is, as many buffer cell allocation information areas Ac1-AcN as the buffer cells bc1-bcN of the packet buffer 402 are prepared for the buffer cell allocation information storage 303.

For example, allocation identification data is binary data of 1 and 0, and the initial value is 0. When the buffer cell bc1 is allocated, for example, 1 is written into the buffer cell allocation information area Ac1 corresponding to the buffer cell bc1. On the other hand, after data written into the buffer cell bc1 is read, 0 is written into the buffer cell allocation information area Ac1, based on control signal Sc1 output from a TD controller 701, and the buffer cell bc1 is freed.

In this way, the respective allocation states of the buffer cells bc1-bcN included in the packet buffer 402 are expressed as a set of values in the buffer cell allocation information areas Ac1-AcN to be supplied to the buffer cell allocator 302 as allocation buffer cell information Iba.

The process-waiting buffer cell information storage 502 has buffer cell designation areas Rc (Rc1-RcN) for storing buffer cell number Nbuf, which indicates a specific one of the buffer cells bc1-bcN included in the packet buffer 402. Preferably, the process-waiting buffer cell information storage 502 comprises a ring memory, and the buffer cell designation areas Rc1-RcN are recorded continuously and cyclically.

The buffer cell designation area RcN (n is a natural number of 1 or more and N or less), into which buffer cell number Nbuf should be written, is indicated by write pointer WP. The buffer cell designation area Rcn, from which written buffer cell number Nbuf should be read, is indicated by read pointer RP. Write pointer WP is moved based on write pointer update signal Bwp output from the process-waiting buffer cell information controller 501 as described above, while read pointer RP is moved based on control signal Sc2 output from the TD controller 701.

The case where the position of write pointer WP is different from that of read pointer RP means that the buffer cell bcn indicated by the buffer cell designation area Rcn pointed by read pointer RP has finished storing data and is in a readable state. The case where write pointer WP and read pointer RP point the same position means that there is no buffer cell bcn that is in a data-readable state.

A packet filter 601 compares a packet identifier, which is provided in a specific bit position of packet data stored in a buffer cell, and a bit string indicated by the TD controller 701 and notifies that they match or mismatch to the TD controller 701. The packet identifier is read from the packet buffer 402 and supplied to the packet filter 601 by controlling the packet buffer control portion 401 by the TD controller 701.

The TD controller 701 generates control signal Sc, which controls the operation of each component of a packet data processor 800, based on state signal Sr and outputs control signal Sc to the packet data processor 800. The explanation of the control of the packet data processor 800 of generation of state signal Sr and control signal Sc are omitted as it is publicly known art.

Figure 7:
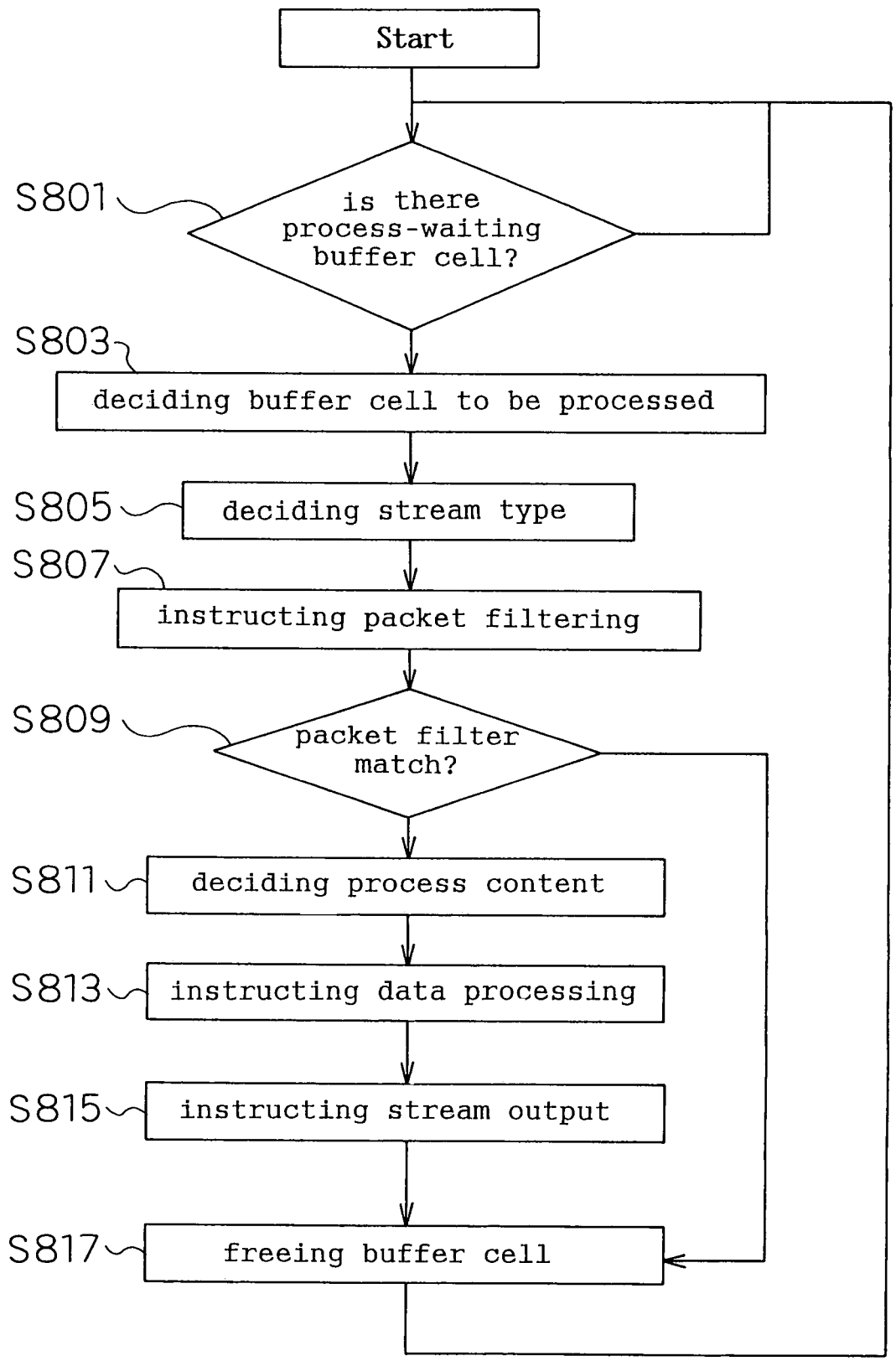
FIG. 7 is a flow chart showing the detailed operation of a TD controller 701 in FIG. 1.

An example of the process algorithm of the TD controller 701 is described using FIG. 7.

The TD controller 701 starts its operation after the power is ON or after the initialization process, and the process proceeds to step S801.

In step S801, whether there is a process-waiting buffer cell or not is determined. In the case where there is no process-waiting buffer cell, that is, in the case where write pointer WP and read pointer RP in the process-waiting buffer cell information storage 502 are compared and their values are equal, is determined as there being no process-waiting buffer cell, the process returns to step S801 and continues waiting until there is a process-waiting buffer cell. In the case where there is a process-waiting buffer cell, that is, in the case where write pointer WP and read pointer RP in the process-waiting buffer cell information storage 502 are compared and their values are not equal, is determined as there being a process-waiting buffer cell, and the process proceeds to the next step S803.

In step S803, the TD controller 701 reads the data of the address pointed by the read pointer RP of the process-waiting buffer cell information storage 502 and decides a buffer cell to be processed in the packet buffer 402. Then, the process proceeds to the next step S805.

In step S805, the TD controller 701 reads code TSST, which indicates the type of the stream stored in the buffer cell to be processed decided in the step S803, and decides the type of the stream stored in the buffer cell to be processed. Then, the process proceeds to the next step S807.

In step S807, the TD controller 701 calculates the address where the packet identifier PID of the packet data in the buffer cell to be processed is stored, based on the stream type decided in the step S805 and controls the packet buffer control portion 401 to read the packet identifier PID and transfer it to the packet filter 601. On the other hand, the packet filter 601 performs packet filtering. That is, it compares the packet identifier PID and a bit string indicated by the TD controller 701 and notifies that they match or mismatch to the TD controller 701. Then, the process proceeds to the next step S809.

In step S809, whether the result of the packet filtering is match or mismatch is determined. The case of mismatch is determined as No, and the process proceeds to step S817. The case of match is determined as Yes, and the process proceeds to step S811.

In step S811, what process is performed on the packet data is decided. Then, the process proceeds to the next step S813.

In step S813, the TD controller 701 instructs the packet data processing portion to perform the data processing decided in the step S811. Then, the process proceeds to the next step S815.

In step S815, the TD controller 701 instructs the stream output portion to output the packet data, on which the data processing is already performed, as a stream. Then, the process proceeds to the next step S817.

In step S817, the TD controller 701 frees the buffer cell in which the packet data, which has become unnecessary after all processes were finished, is stored in order to store newly input packet data or store packet data after data processing. Then, the process returns to step S801 and repeats the above process routine.

A packet data processing portion 111 is functionally the same as a packet data processing portion 112, and therefore, only the packet data processing portion 111 is described.

The packet data processing portion 111 performs a predetermined process on packet data stored in a buffer cell, according to the direction of the TD controller 701.

Figure 8:
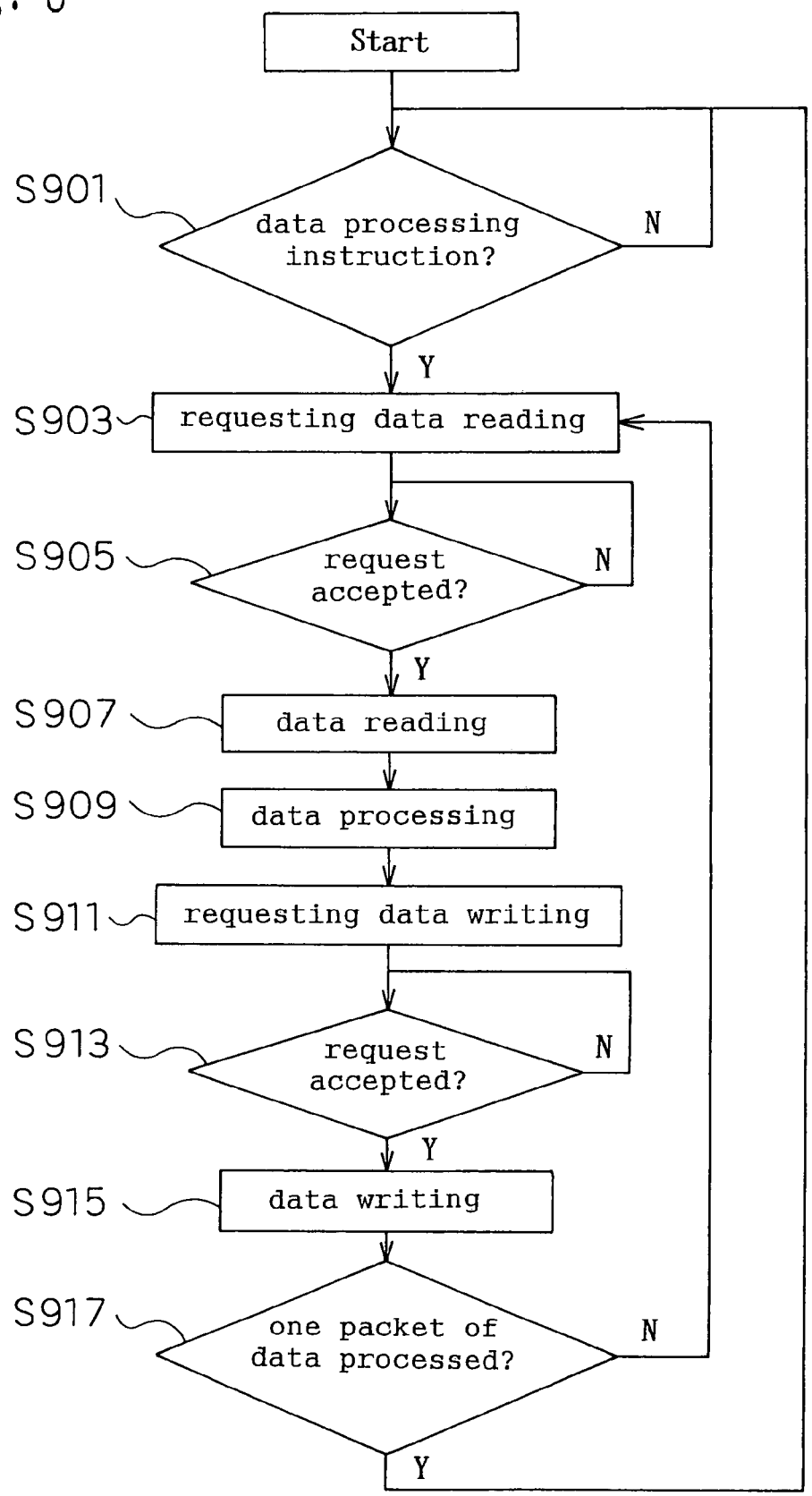
FIG. 8 is a flow chart showing the detailed operation of a packet data processing portion in FIG. 1.

The operation of the packet data processing portion 111 is described using FIG. 8.

The packet data processing portion 111 starts its operation according to the direction of the TD control portion 701, and the process proceeds to step S901.

In step S901, whether a data processing instruction for the packet data processing portion 111 is generated from the TD controller 701 or not is determined. The case where the data processing instruction is not generated is determined as No, and the process continues waiting for the data processing instruction to be generated. The case where the data process-ing instruction is generated is determined as Yes, and the process proceeds to step S903.

In step S903, the packet data processing portion 111 outputs data transfer request signal Req to the arbitration portion 200 in order to read data to be processed, by the predetermined number of bytes at a time, from the packet buffer 402. Then, the process proceeds to the next step S905.

In step S905, whether the data transfer request of the packet data processing portion 111 has been accepted or not is determined. That is, whether data effective signal ENB, which indicates that the data transfer request has been accepted from the arbitration portion 200, is effective or not is determined. The case where data effective signal ENB is not effective is determined as No, and the process returns to step S905 and continues this until data effective signal ENB becomes effective. The case where data effective signal ENB is effective is determined as Yes. Then, the process proceeds to the next step S907.

In step S907, the data processing portion 111 reads data TSD read from the packet buffer 402 and stores it in the internal buffer. Then, the process proceeds to the next step S909.

In step S909, the data processing portion 111 performs the predetermined process on the data stored in the internal buffer. Then, the process proceeds to the next step S911.

In step S911, the data processing portion 111 outputs data transfer request signal Req to the arbitration portion 200 in order to write back the processed data, by the predetermined number of bytes at a time, into the packet buffer 402. Then, the process proceeds to the next step S913.

In step S913, whether the data transfer request of the packet data processing portion 111 has been accepted or not is determined. That is, whether data effective signal ENB, which indicates that the data transfer request has been accepted from the arbitration portion 200, is effective or not is determined. The case where data effective signal ENB is not effective is determined as No, and the process returns to step S913 and continues this until data effective signal ENB becomes effective. The case where data effective signal ENB is effective is determined as Yes. Then, the process proceeds to the next step S915.

In step S915, the data processing portion 111 outputs the processed data TSD and stores it in the packet buffer 402. Then, the process proceeds to the next step S917.

In step S917, whether after one packet of data was processed in the data processing portion 111, it has been written back into the packet buffer 402 or not is determined. The case where the process of one packet of data is not completed is determined as No, and the process returns to step S903 and continues data processing. The case where the process of one packet of data is completed is determined as Yes, and the process returns to step S901 and waits for the next data processing instruction from the TD controller 701.

A stream output portion 121 is functionally the same as a stream output portion 122, and therefore, only the stream output portion 121 is described.

The stream output portion 121 outputs as stream SO1 packet data stored in a buffer cell, according to the direction of the TD controller 701.

Figure 9:
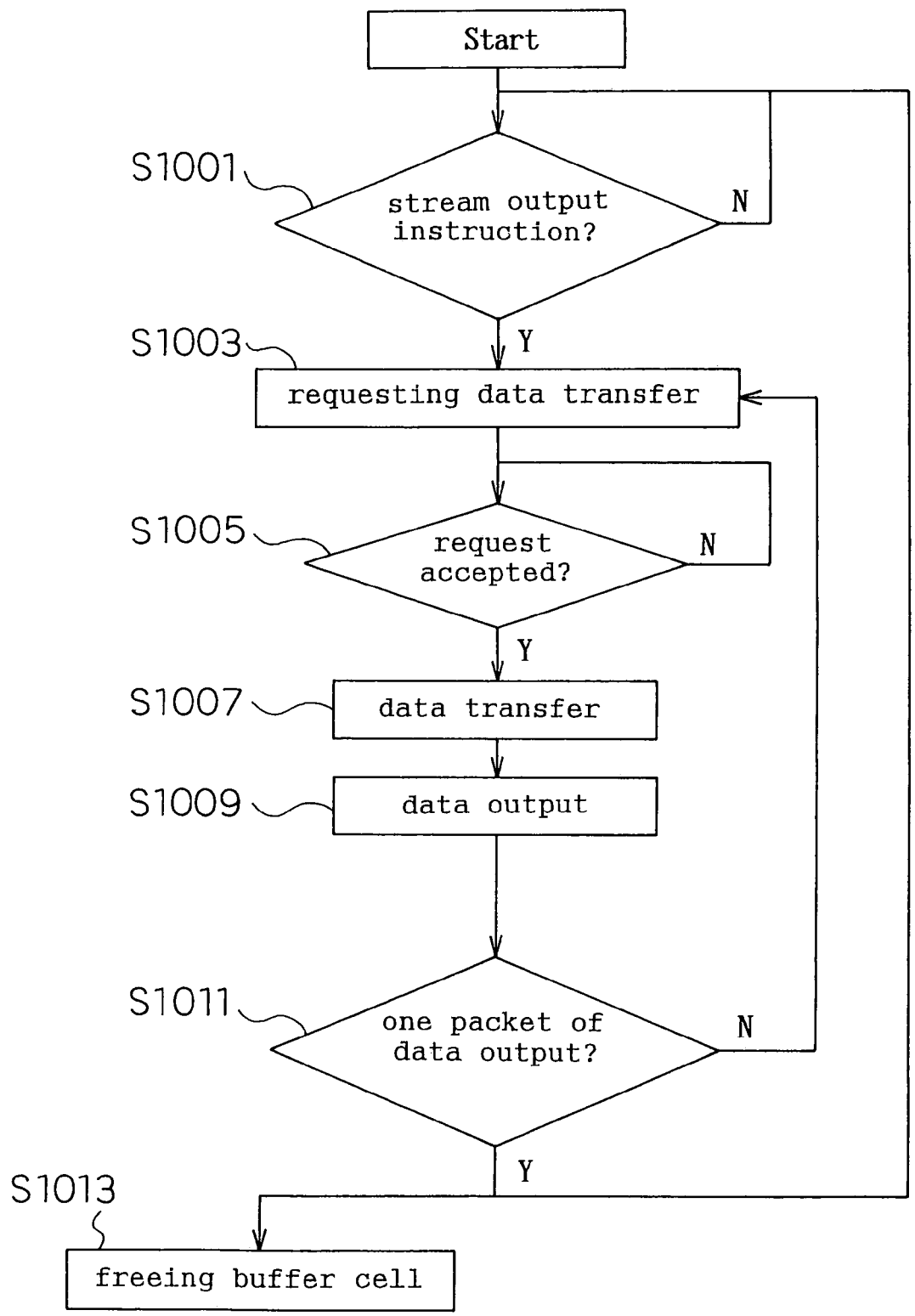
FIG. 9 is a flow chart showing the detailed operation of a stream output portion in FIG. 1.
Figure 10:
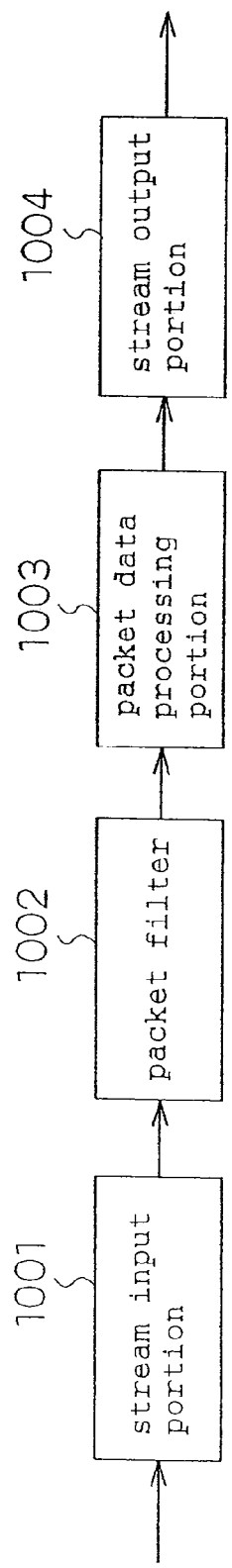
FIG. 10 is a block diagram showing an example of the structure of a conventional stream data processor.
Figure 11:
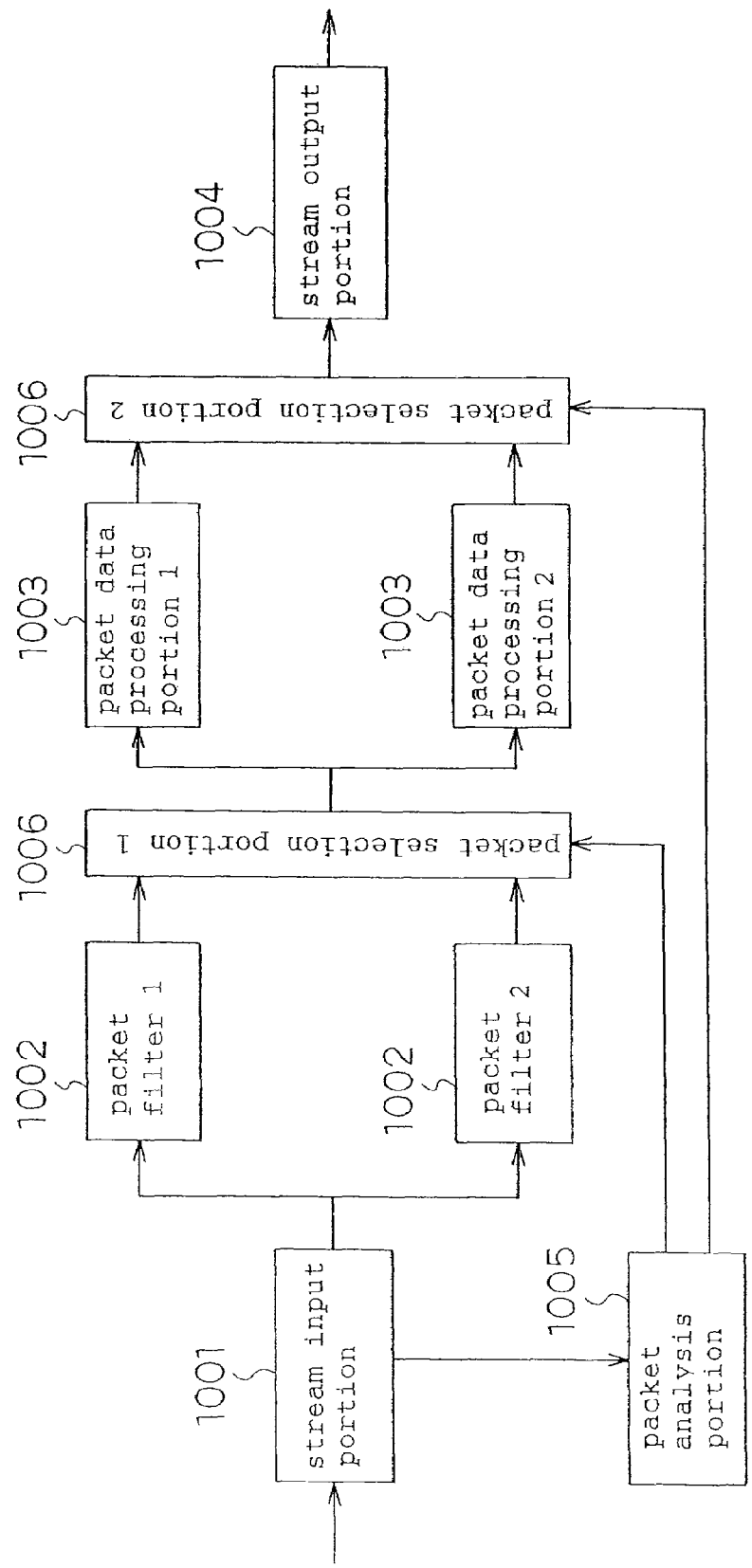
FIG. 11 is a block diagram showing an example of the structure of a device in which a conventional stream data processor is extended so that various types of streams can be processed.
Figure 12:
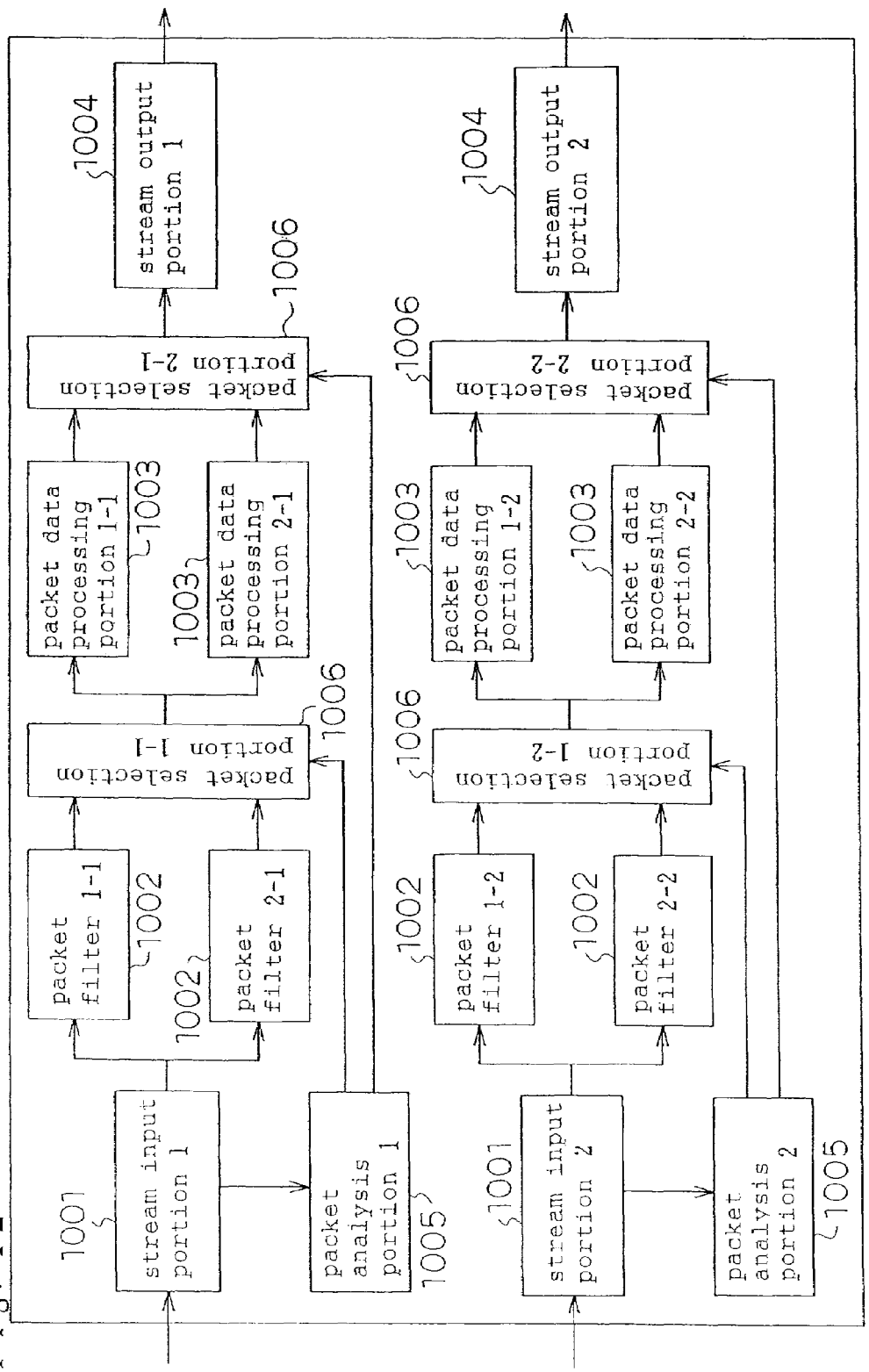
FIG. 12 is a block diagram showing an example of the structure of a device in which a plurality of the data stream devices as shown in FIG. 11 are provided so that various types of streams can be processed.

The operation of the stream output portion 121 is described using FIG. 9.

The stream output portion 121 starts its operation according to the direction of the TD control portion 701, and the process proceeds to step S1001.

In step S1001, whether a stream output instruction for the stream output portion 121 is generated from the TD controller 701 or not is determined. The case where the stream output instruction is not generated is determined as No, and the process returns to step S1001 and continues waiting for the stream output instruction. The case where the stream output instruction is generated is determined as Yes, and the process proceeds to the next step S1003.

In step S1003, the stream output portion 121 outputs data transfer request signal Req to the arbitration portion 200 in order to read data for stream output, by the predetermined number of bytes at a time, from the packet buffer 402. Then, the process proceeds to the next step S1005.

In step S1005, whether the data transfer request of the stream output portion 121 has been accepted or not is determined. That is, whether data effective signal ENB, which indicates that the data transfer request has been accepted from the arbitration portion 200, is effective or not is determined. The case where data effective signal ENB is not effective is determined as No, and the process returns to step S1005 and continues this until data effective signal ENB becomes effective. The case where data effective signal ENB is effective is determined as Yes. Then, the process proceeds to the next step S1007.

In step S1007, the stream output portion 121 reads data TSD read from the packet buffer 402 and stores it in the internal buffer. Then, the process proceeds to the next step S1009.

In step S1009, the stream output portion 121 outputs as a stream the data stored in the internal buffer. Then, the process proceeds to the next step S1011.

In step S1011, whether one packet of data has been output as a stream by the stream output portion 121 or not is determined. The case where the stream output of one packet is not completed is determined as No, and the process returns to step S1003 and continues stream output. The case where the stream output of one packet is completed is determined as Yes, and the process returns to step S1001 and waits for the next stream output instruction from the TD controller 701.

Second Embodiment

Figure 5:
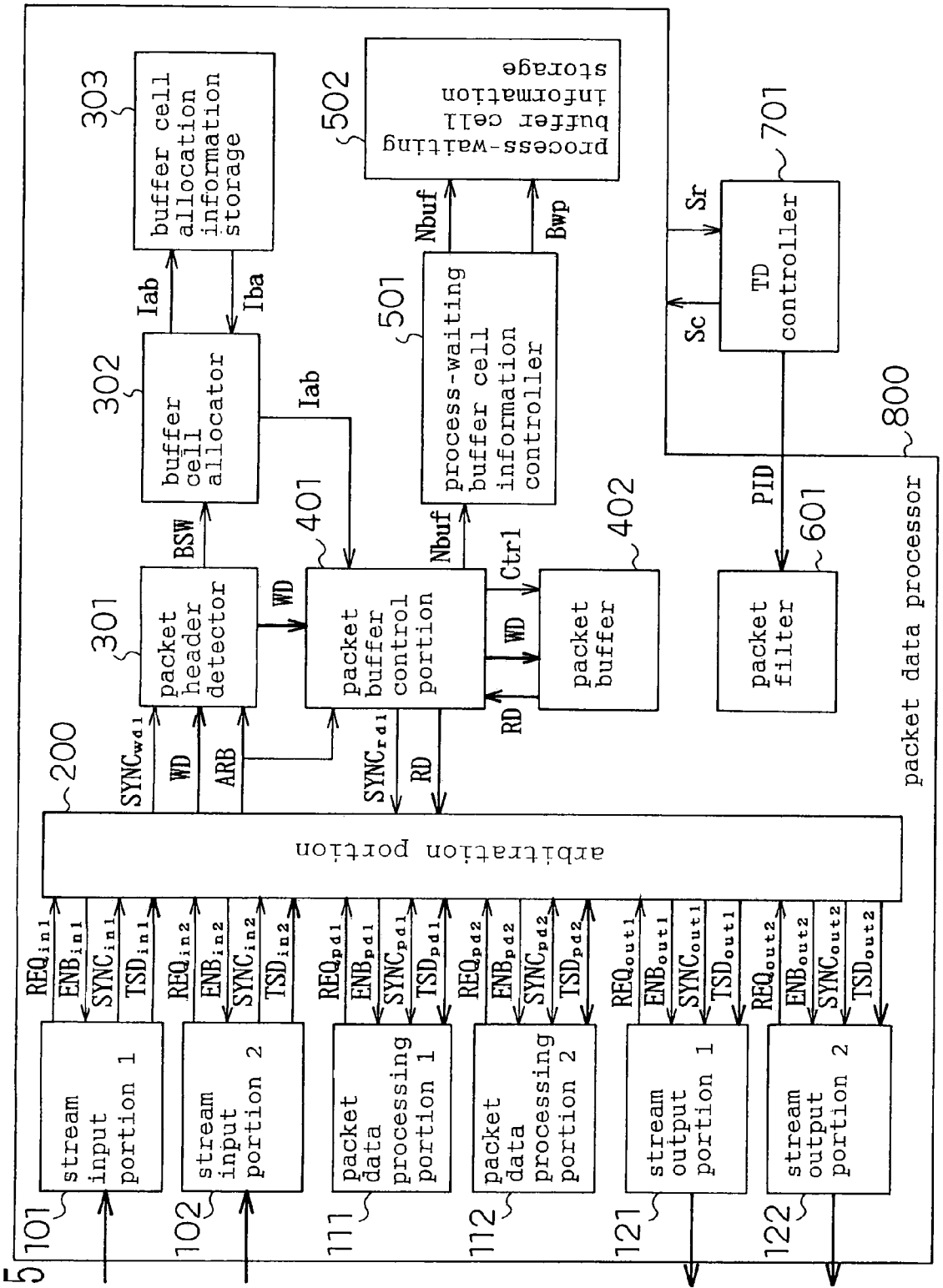
FIG. 5 is a system diagram of a stream data processor that can process various types of streams according to a second embodiment of the present invention.

A second embodiment of the present invention is described using FIG. 5.

FIG. 1 in the first embodiment and FIG. 6 in the second embodiment differ in how packet identifier PID is transferred to the packet filter 601. Only this difference is described.

In the second embodiment, the TD controller 701 reads a specific bit string, which is present in a buffer cell to be processed in the packet buffer 402, and transfers this as packet identifier PID to the packet filter 601.

For different types of streams, usually, bit positions in packets in which packet identifiers are present are different. In the case of the second embodiment, if the TD controller 701 is formed by a CPU and its operation is made programmable, bit strings, which are provided in various positions in a buffer cell to be processed, can be read, so that the packet filtering of various types of streams can be implemented.

Third Embodiment

Figure 4:
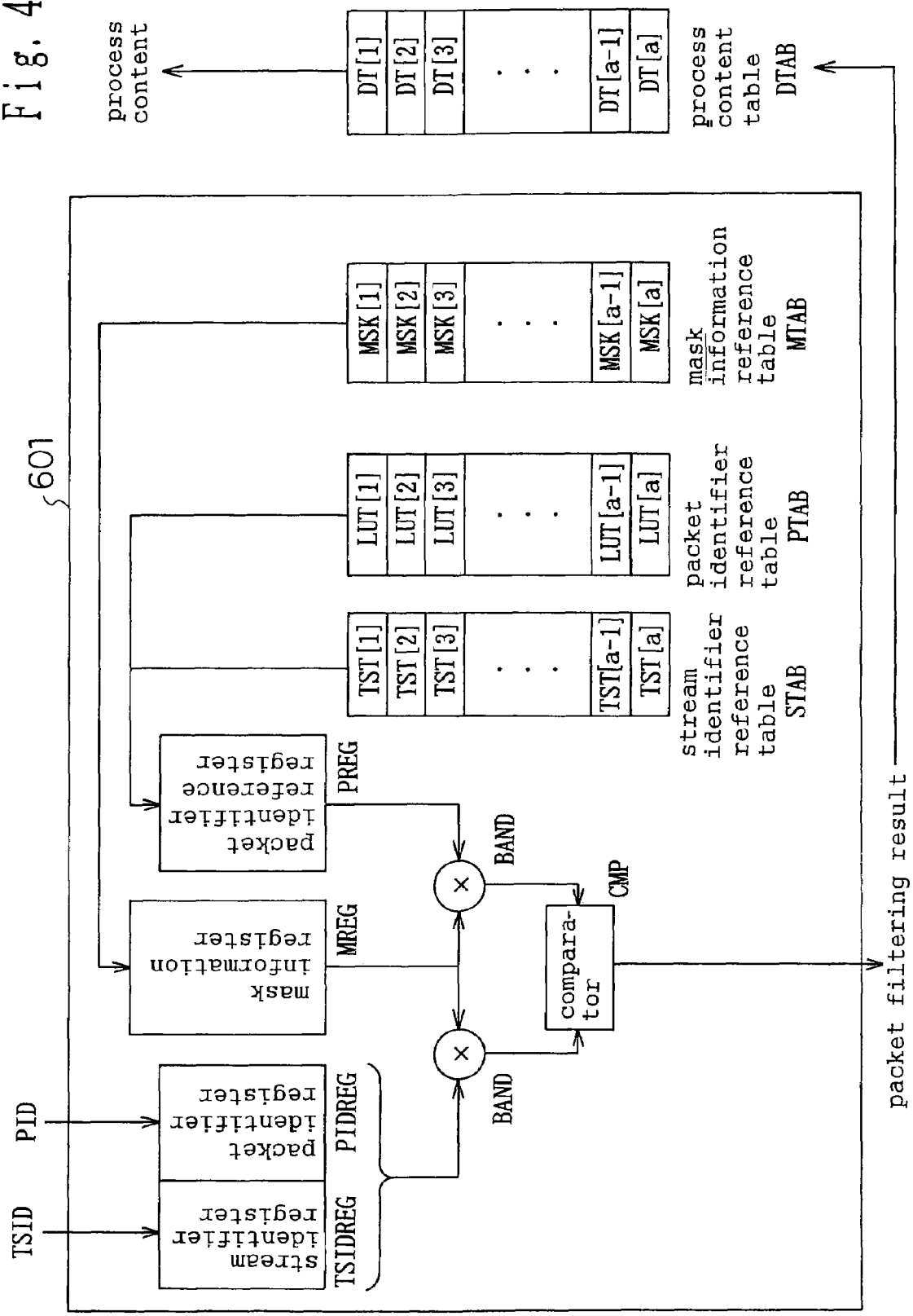
FIG. 4 is a block diagram showing the detailed structure of a packet filter 601 as shown in FIG. 1 according to a third embodiment of the present invention.

A third embodiment of the present invention is described using FIG. 4.

FIG. 4 is a view schematically showing the packet filter 601 which enables the packet filtering of various types of streams using stream identifier TSID and mask information MSK.

A mask information reference table MTAB comprises (a) elements MSK[1], MSK[2], . . . , and MSK[a], and the bit length of each element is L. A stream identifier reference table STAB comprises (a) elements TST[1], TST[2], . . . , and TST[a], and the bit length of each element is M. A packet identifier reference table PTAB comprises (a) elements LUT [1], LUT[2], . . . , and LUT[a], and the bit length of each element is N (a, L, M, and N are natural numbers). A process content table DTAB comprises (a) elements DT[1], DT [2], . . . , and DT [a], and stores the content of a process that should be performed on a packet to be processed, based on a comparison result of the packet filter.

The relationship of L=M+N holds among L, M, and N. The bit length of stream identifier TSID is determined depending on the number of stream input portions included in the stream data processor of the present invention. The value of each of the above elements is set previously by the TD controller 701.

Also, stream identifier TSID, which is provided to a packet to be processed by the stream input portion, is set in a stream identifier register TSIDREG, and the packet identifier PID of the packet to be processed is set in a packet identifier register PIDREG by extending the high-order bit by 0 so that the packet identifier PID has the bit length L.

Packet filtering starts according to the packet filtering instruction of the TD controller 701.

First, the number 1 element MSK[1] of the mask information reference table MTAB is read by a mask information register MREG, and the number 1 element TST[1] of the stream identifier reference table STAB and the number 1 element LUT[1] of the packet identifier reference table PTAB are read by a PLUT register PREG.

Subsequently, the connection of the stream identifier register TSIDREG and the packet identifier register PIDREG as well as the mask information register MREG are processed by an AND operator for each bit BAND. Similarly, the packet identifier reference register PREG and the mask information register MREG are processed by an AND operator for each bit BAND. Then, the results of the above two AND operations are compared by a comparator CMP, and if they match, the numbers 1 of the tables are output as the result of packet filtering.

Subsequently, similar comparison and operations are repeated for all numbers, that is, 1 to a, of the tables, and numbers for which comparison results match are output as the result of packet filtering. With this packet filter, the comparison and collation of a packet identifier having any bit length of N bit or less can be performed.

In this way, if the packet filter described in this embodiment is applied to the packet filters in the first and second embodiments, the packet filtering of various types of streams can be implemented easily and efficiently.

The present invention is a program of causing a computer to perform the function of all or part of the means (or devices, elements, circuits, portions, or the like) of the stream data processor of the present invention as described above, the program operating cooperatively with the computer.

Also, the present invention is a medium supporting the program of the present invention as described above, the program, which is readable and is read by a computer, performing the operation cooperatively with the computer.

Further, part of the means (or devices, elements, circuits, portions, or the like) of the present invention and part of the steps (or processes, operations, actions, or the like) of the present invention either mean, among a plurality of these means or steps, a number of means or steps, or mean part of the functions or operations of one means or step.

Also, in one use form of the program of the present invention, the program may be transmitted through a transmission medium, read by a computer, and operate cooperatively with the computer.

Also, the data structure of the present invention includes a database, data format, data table, data list, data type, and the like.

Also, the recording medium includes ROM and the like, and the transmission medium includes a transmission medium such as the internet, light•radio waves•acoustic waves and the like.

Also, the computer of the present invention as described above is not limited to sheer hardware such as CPU and may include firmware, OS, and further peripheral equipment.

As described above, the structure of the present invention may be implemented as software or may be implemented as hardware.

INDUSTRIAL APPLICABILITY

As described above, according to the present invention, a system suitable for the data processing of packets included in various types of streams can be implemented, and therefore, the system can be used as a platform for the stream processing of various digital information equipment such as set top boxes, digital TVs, game machines, and home gateways.

Also, in the present invention, after data in plurality of streams is stored packet by packet, packet filtering and the data processing for a selected packet are performed for each packet, and therefore, there is no need of locating a plurality of data processing portions having the same function, so that a smaller device and a lower cost can be achieved.

The invention claimed is:

1. A stream data processor for processing and editing a plurality of input streams with different formats, each input stream including packets, the stream data processor comprising:
   a packet buffer for storing the packets;
   a plurality of stream input portions for receiving respectively the input streams to perform detection of packet headers and data transfer to the packet buffer;
   an arbitration portion for performing arbitration of a request for data transfer;
   a buffer cell allocation directing device for directing allocation of respective buffer cells for inputting the packet headers;
   a buffer cell allocator for allocating an unused buffer cell based on buffer cell allocation information, according to the directed allocation;
   a buffer cell allocation information storing portion for storing the buffer cell allocation information;
   a packet buffer controller for controlling the packet buffer;
   a process-waiting buffer cell information storing portion for storing process-waiting buffer cell information on an order in which the buffer cells are to be processed;
   a packet filter for determining whether the packets should be processed or not, based on packet identifiers of the respective packets;
   a plurality of packet data processing portions for performing respectively predetermined processes for packet data;
   a plurality of stream output portions for reconstructing respectively the packet data as a stream to output the stream; and
   a controller for controlling the packet data processing portions to perform the predetermined processes based on a result of determination of the packet filter,
   wherein the packet filter, which is connected to the arbitration portion, obtains a packet identifier of a packet stored in the packet buffer by performing request for data transfer to the arbitration portion, and determines whether a packet of the packets stored in the packet buffer, should be processed or not.

2. A stream data processor for processing and editing a plurality of input streams with different formats, each input stream including packets, the stream data processor comprising:
   a packet buffer for storing the packets;
   a plurality of stream input portions for receiving respectively the input streams to perform detection of packet headers and data transfer to the packet buffer;
   an arbitration portion for performing arbitration of a request for data transfer;
   a buffer cell allocation directing device for directing allocation of respective buffer cells for inputting the packet headers;
   a buffer cell allocator for allocating an unused buffer cell based on buffer cell allocation information, according to the directed allocation;
   a buffer cell allocation information storing portion for storing the buffer cell allocation information;
   a packet buffer controller for controlling the packet buffer;
   a process-waiting buffer cell information storing portion for storing process-waiting buffer cell information on an order in which the buffer cells are to be processed;
   a packet filter for determining whether the packets should be processed or not, based on packet identifiers of the respective packets;
   a plurality of packet data processing portions for performing respectively predetermined processes for packet data;
   a plurality of stream output portions for reconstructing respectively the packet data as a stream to output the stream; and
   a controller for controlling the packet data processing portions to perform the predetermined processes based on a result of determination of the packet filter,
   wherein the packet filter is connected to the controller, the controller reads a packet identifier of a packet stored in the packet buffer to supply the packet identifier with the packet filter, and based on the supplied packet identifier, the packet filter determines whether a packet of the packets stored in the packet buffer, should be processed or not.

3. The stream data processor for processing and editing a plurality of input streams with different formats, each input stream including packets, the stream data processor comprising:
   a packet buffer for storing the packets;
   a plurality of stream input portions for receiving respectively the input streams to perform detection of packet headers and data transfer to the packet buffer;
   an arbitration portion for performing arbitration of a request for data transfer;
   a buffer cell allocation directing device for directing allocation of respective buffer cells for inputting the packet headers;
   a buffer cell allocator for allocating an unused buffer cell based on buffer cell allocation information, according to the directed allocation;
   a buffer cell allocation information storing portion for storing the buffer cell allocation information;
   a packet buffer controller for controlling the packet buffer;
   a process-waiting buffer cell information storing portion for storing process-waiting buffer cell information on an order in which the buffer cells are to be processed;

a packet filter for determining whether the packets should be processed or not, based on packet identifiers of the respective packets;

a plurality of packet data processing portions for performing respectively predetermined processes for packet data;

a plurality of stream output portions for reconstructing respectively the packet data as a stream to output the stream; and a controller for controlling the packet data processing portions to perform the predetermined processes based on a result of determination of the packet filter, wherein the packet filter comprises a packet identifier reference table, a packet identifier mask table for making all or specific part of a packet identifier out of identification, an AND operator, and a comparator which determines whether a packet should be processed or not by comparing a logical product of a packet identifier in the packet data and the packet identifier mask table and a logical product of the packet identifier reference table and the packet identifier mask table, and a packet included in a stream in which a bit length of a packet identifier is different is identified.

4. The stream data processor according to claim 3, wherein the stream data processor further has a process content table corresponding one-to-one to the packet identifier reference table, a packet having a specific packet identifier is detected by the packet filter, and process of the packet is performed by referring to the process content table.

5. A stream data processor for processing and editing a plurality of input streams with different formats, each input stream including packets, the stream data processor comprising:

a packet buffer for storing the packets;

a plurality of stream input portions for receiving respectively the input streams to perform detection of packet headers and data transfer to the packet buffer;

an arbitration portion for performing arbitration of a request for data transfer;

a buffer cell allocation directing device for directing allocation of respective buffer cells for inputting the packet headers;

a buffer cell allocator for allocating an unused buffer cell based on buffer cell allocation information, according to the directed allocation;

a buffer cell allocation information storing portion for storing the buffer cell allocation information;

a packet buffer controller for controlling the packet buffer;

a process-waiting buffer cell information storing portion for storing process-waiting buffer cell information on an order in which the buffer cells are to be processed;

a packet filter for determining whether the packets should be processed or not, based on packet identifiers of the respective packets;

a plurality of packet data processing portions for performing respectively predetermined processes for packet data;

a plurality of stream output portions for reconstructing respectively the packet data as a stream to output the stream; and a controller for controlling the packet data processing portions to perform the predetermined processes based on a result of determination of the packet filter, wherein the packet filter comprises a packet identifier reference table, a stream identifier reference table, an AND operator, and a comparator which determines whether a packet should be processed or not by comparing a packet identifier in the packet data and the packet identifier reference table as well as comparing a stream identifier in the packet data and the stream identifier reference table, and packet selection is made even when there is duplication of packet identifiers among a plurality of streams, and wherein the stream data processor further has a process content table corresponding one-to-one to the stream identifier reference table, and process of a packet having a specific packet identifier included in a specific data stream is performed by referring to the process content table.

6. A stream data processor for processing and editing a plurality of input streams with different formats, each input stream including packets, the stream data processor comprising:

a packet buffer for storing the packets;

a plurality of stream input portions for receiving respectively the input streams to perform detection of packet headers and data transfer to the packet buffer;

an arbitration portion for performing arbitration of a request for data transfer;

a buffer cell allocation directing device for directing allocation of respective buffer cells for inputting the packet headers;

a buffer cell allocator for allocating an unused buffer cell based on buffer cell allocation information, according to the directed allocation;

a buffer cell allocation information storing portion for storing the buffer cell allocation information;

a packet buffer controller for controlling the packet buffer;

a process-waiting buffer cell information storing portion for storing process-waiting buffer cell information on an order in which the buffer cells are to be processed;

a packet filter for determining whether the packets should be processed or not, based on packet identifiers of the respective packets;

a plurality of packet data processing portions for performing respectively predetermined processes for packet data;

a plurality of stream output portions for reconstructing respectively the packet data as a stream to output the stream; and a controller for controlling the packet data processing portions to perform the predetermined processes based on a result of determination of the packet filter, wherein the packet filter comprises a packet identifier reference table, a packet identifier mask table for making all or specific part of a packet identifier out of identification, a stream identifier reference table, an AND operator, and a comparator which determines whether a packet should be processed or not by comparing a logical product of a packet identifier in the packet data and the packet identifier mask table and a logical product of the packet identifier reference table and the packet identifier mask table as well as comparing a stream identifier in the packet data and the stream identifier mask table, and a packet included in a plurality of streams in which a bit length of a packet identifier is different is identified.

7. The stream data processor according to claim 6, wherein the stream data processor further has a process content table corresponding one-to-one to the packet identifier reference table, and process of a packet having a specific packet identifier included in a specific data stream is performed by referring to the process content table.

8. A stream data processor for processing and editing a plurality of input streams with different formats, each input stream including packets, the stream data processor comprising:
- a packet buffer for storing the packets;
- a plurality of stream input portions for receiving respectively the input streams to perform detection of packet headers and data transfer to the packet buffer;
- an arbitration portion for performing arbitration of a request for data transfer;
- a buffer cell allocation directing device for directing allocation of respective buffer cells for inputting the packet headers;
- a buffer cell allocator for allocating an unused buffer cell based on buffer cell allocation information, according to the directed allocation;
- a buffer cell allocation information storing portion for storing the buffer cell allocation information;
- a packet buffer controller for controlling the packet buffer;
- a process-waiting buffer cell information storing portion for storing process-waiting buffer cell information on an order in which the buffer cells are to be processed;
- a packet filter for determining whether the packets should be processed or not, based on packet identifiers of the respective packets;
- a plurality of packet data processing portions for performing respectively predetermined processes for packet data;
- a plurality of stream output portions for reconstructing respectively the packet data as a stream to output the stream; and
- a controller for controlling the packet data processing portions to perform the predetermined processes based on a result of determination of the packet filter,
- wherein the process-waiting buffer cell information storing portion comprises one storage element for storing a number of the buffer cells to be processed in the order in which the buffer cells are to be processed, and further stores contents of the predetermined processes performed in the packet data processing portions.

9. The stream data processor according to any one of claims 1, 2, 3, 5, 6 and 8, wherein the packet buffer comprises one storage, and the stream input portions and the packet data processing portions respectively perform arbitration and data transfer for the packet buffer to perform packet data processing.

10. The stream data processor according to any one of claims 1, 2, 3, 5, 6 and 8, wherein the packet filter comprises a plurality of filters for determining, from a packet identifier of a packet included in a specific type of stream, whether the packets should be processed or not, to enable identification with the packet identifiers of the packets included in different types of streams.

11. The stream data processor according to any one of claims 1, 2, 3, 6 and 8, wherein the packet filter comprises a packet identifier reference table, a stream identifier reference table, an AND operator, and a comparator which determines whether a packet should be processed or not by comparing a packet identifier in the packet data and the packet identifier reference table as well as comparing a stream identifier in the packet data and the stream identifier reference table, and packet selection is made even when there is duplication of packet identifiers among a plurality of streams.

12. A stream data processor according to any one of claims 1, 2, 3, 5, 6 and 8, wherein the process-waiting buffer cell information storing portion comprises one storage element for storing a number of the buffer cells to be processed in the order in which the buffer cells are to be processed.

13. The stream data processor according to any one of claims 1, 2, 3, 5, 6 and 8, wherein the process-waiting buffer cell information storing portion comprises one storage element for storing a number of the buffer cells to be processed in the order in which the buffer cells are to be processed, and further stores a number of tables for referring to the processed buffer cells.

14. The stream data processor according to any one of claims 1, 2, 3, 5, 6 and 8, wherein the buffer cell allocator detects that there are no buffer cells to be allocated, and no buffer cells are allocated for a buffer cell allocation request.

* * * * *